United States Patent Office 3,502,697
Patented Mar. 24, 1970

3,502,697
ANTIBACTERIAL AGENTS
Robert B. Woodward, Belmont, Mass., assignor to Chas. Pfizer & Co., Inc., New York, N.Y., a corporation of Delaware
No Drawing. Original application Sept. 2, 1966, Ser. No. 576,826. Divided and this application Jan. 3, 1967, Ser. No. 606,554
Int. Cl. C07c 69/76
U.S. Cl. 260—351          6 Claims This application is a division of copending application Ser. No. 576,826, filed Sept. 2, 1966, which is in turn a continuation-in-part of application Ser. No. 531,348, filed Mar. 3, 1966, which is in turn a divisional application of Ser. No. 209,220, filed July 11, 1962, both of which are now abandoned, said latter application being a continuation-in-part of now abandoned application Ser. No. 72,-840, filed Dec. 1, 1960, which is in turn a continuation-in-part of application Ser. No. 24,895, filed Apr. 27, 1960, now abandoned.

This invention is concerned with certain tricyclic ketones, the process for their preparation and with the new compounds useful as intermediates therefor.

The new compounds within the scope of the present invention include 3,4,10-trioxo-1,2,3,4,4a,9,9a,10-octahydroanthracenes of the following formula (depicted here in the 10-enol form although other tautomers are possible):

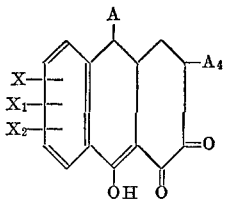

wherein:

X is selected from the group consisting of hydrogen, hydroxy, trifluoromethyl, amino, mono- and di-lower alkyl amino, alkanoylamino containing 2 to 4 carbon atoms, lower alkyl, alkanoyloxy containing 2 to 4 carbon atoms; and OR wherein R is selected from the group consisting of lower alkyl and benzyl;
$X_1$ is selected from the group consisting of hydrogen, chloro, trifluoromethyl and lower alkyl;
$X_2$ is selected from the group consisting of hydrogen, hydroxy and OR wherein R is as previously described;
A is selected from the group consisting of hydrogen, and lower alkyl; and
$A_4$ is selected from the group consisting of hydrogen, lower carbalkoxy, carbobenzyloxy and cyano.

It should be noted that whereas the X, $X_1$ and $X_2$ substituents are arranged in that order in the generic structure I, this representation is for convenience only. In actual practice these groups can occur in any sequence in the benzenoid moiety.

When the substituents of the present compounds are hydroxy or amino, the use of a blocking group is sometimes advantageous in obtaining high yields during their preparation. Especially useful blocking groups are acyl, benzyl tetrahydropyranyl, methoxymethyl, methyl and ethyl radicals. Benzyl ethers are particularly easily reduced to hydroxyl groups. Hydroxyl groups are conveniently protected during basic reaction steps by prior conversion to the tetrahydropyranyl ether, which is easily rehydrolyzed under mildly acidic conditions. Where carboxylic acid groups are present in the molecule, these should be esterified prior to tetrahydropyranyl ether formation, to avoid formation of tetrahydropyranyl esters.

Acyl groups which may be used include the acetyl, propionyl, butyryl, benzoyl and the like. The lower alkyl blocking groups are preferred because of the ease with which these compounds are prepared.

The new compounds of this invention may be prepared according to the following sequence of reactions.

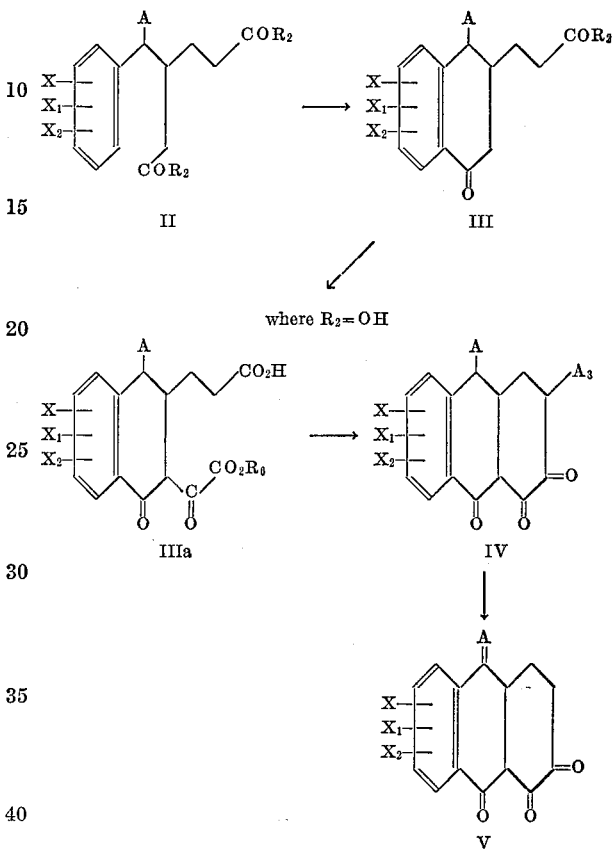

In the above formulae X, $X_1$, $X_2$ and A are as previously defined; $A_3$ is lower carbalkoxy, carbobenzyloxy or cyano; $R_6$ is lower alkyl or benzyl; and $R_2$ is hydroxy, lower alkoxy, benzyloxy or halo. Alternatively, the corresponding nitriles (e.g. where $COR_2$ is replaced by CN) may be used, with the proviso that nitriles of structure II should contain a m-hydroxy or -alkoxy substituent to permit ring closure via the Hoesch synthesis, discussed hereinafter. Further, at least one of the two positions of the benzenoid ring ortho to the diester side chain must be available for the ring closure of compounds of structure II to the structure III compounds. If desired, halogen (Cl or Br) may be introduced into compounds of structure II and III in which at least one of the benzenoid substituents is hydrogen by direct halogenation with a chlorinating or brominating agent or by other methods generally employed for halogenation of an aromatic ring. A variety of such agents are known to those in the art and include phosphorus pentachloride and pentabromide, sulfuryl chloride, N-chloro or bromo-alkanoamides, e.g. N-chlor- and N-bromacetamide; N-chloro (or bromo) alkanedioic acid imides, e.g. N-halosuccinimide; N-halophthalimide; chlorine, bromine; N - haloacylanilides, e.g. N - bromo-acetanilide, propionanilide and the like; 3-cholor-, 3-bromo, 3,5-dichloro and 3,5-dibromo-5,5-dimethylhydantoin; pyridinium perbromide and percholoride hydrohalides, e.g. pyridinium perbromide hydrobromide; and lower alkyl hypochlorites, e.g. tertiary butylhypochlorite.

The ring closure of compounds II to III is accomplished by any of the commonly employed methods for such reactions which generally involve the use of a dehydrating or dehydrohalogenating cyclization agent. With compounds of structure II, a preferred method when $R_2$ is OH or alkoxy involves treatment of the starting compound with such ring closure agents as hydrogen fluoride or polyphosphoric acid. When $R_2$ in the starting compound is hydroxyl, it is usually preferred to use hydrogen fluoride; when $R_2$ is lower alkoxy, polyphosphoric acid. When $R_2$ is halogen, a Friedel-Craft's catalyst, of course, should be employed, e.g. aluminum chloride. m-Hydroxy- or alkoxybenzyl compounds of structure II having CN in Place of $COR_2$ lend themselves to the Hoesch synthesis (Berichte, 48, 1122 and 50, 462) wherein treatment with dry hydrogen chloride in the presence of zinc chloride leads to imine formation, and hydrolysis of the latter provides the tetralone keto group.

The condensation of compounds II or III in which $R_2$ is $OR_6$ with oxalic ester as well as ring closure of compounds IIIa (after esterification of the free acid with $R_6OH$) is effected by the general methods for ester condensation reactions of this type. Usually the reaction is carried out in the presence of a strong base such as alkali metal, alkali metal alkoxides and hydrides, sodamide and the like. If the starting compound in the oxalate condensation contains free hydroxyl or amino groups, it is preferred to block such groups by alklation or acylation by known procedures. After the reaction is completed, the blocking groups may be removed, if desired. Cleavage of the ether linkage of other blocking groups by any of the general methods, e.g. treatment with mineral acid such as concentrated hydrobromic or hydriodic acid, or, when R is benzyl, hydrogenolysis, gives free hydroxy groups in the benzenoid portion.

The resulting products from structure II, i.e., the corresponding 2-carbalkoxy, -carbobenzyloxy or -cyano compounds of structure IV, on hydrolysis and decarboxylation yield compounds of structure V.

The starting compounds of the above described processes, i.e., compounds of structure II, are prepared by the following sequence of reactions:

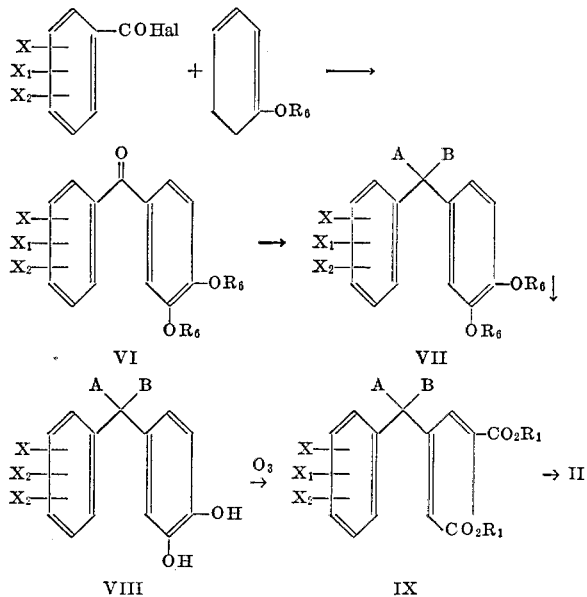

In the above sequence, $R_1$ is hydrogen, lower alkyl or benzyl; A is hydrogen or lower alkyl; $R_6$ is lower alkyl or benzyl; and B is hydrogen or hydroxyl.

The first of these reactions for the preparation of compounds of structure VI is by means of Friedel-Craft's reaction, e.g. $AlCl_3$ in carbon disulfide. The conversion of compounds of structure VI to those of VII in which A and B are hydrogen is by catalytic reduction, e.g. over copper chromium oxide or noble metal, e.g. palladium catalyst at from atmospheric to superatmospheric pressures of hydrogen gas; where A is hydrogen and B is hydroxy, by partial reduction with sodium borohydride or by hydrogenation over palladium catalyst under mild conditions until only one molar proportion of hydrogen is consumed; where A is alkyl and B is hydroxyl, by reaction with a suitable Grignard reagent, e.g. AMg halogen; where A is alkyl or hydrogen and B is hydroxyl. From VII to VII is a standard ether hydrolysis, e.g. concentrated hydrobromic acid. From VIII to IX is an oxidation reaction (hydrogen peroxide or ozone) giving rise to the dienedioic acid ($R_1$=H) which on hydrogenation over a noble metal catalyst, e.g. palladium, palladium on carbon, platinum, platinum oxide, etc., gives compounds of structure II. From VII to IX represents the ozonolysis reaction as applied to the diether to produce IX in the form of a diester. In the hydrogenation reaction, compounds of structure IX may be used as the free acids or corresponding benzyl or lower alkyl esters to provide corresponding products of structure II. Of course, benzyl esters may undergo concurrent hydrogenolysis to the free acids.

In the described reaction sequence, where aromatic halo substituents are present, care should be taken to avoid prolonged hydrogenations which may result in the removal of the halogen atom. The possibility of halogen removal may be minimized by the use of a lower alkanoic acid, e.g. acetic or propionic as solvent for palladium reductions. Of course, if removed, halogen may be reintroduced if desired by the method hereinbefore described. Such reintroduction may be directed to the original substituent position provided that this position is para to a hydroxy, alkoxy, amino, or like substituent. Free amino groups are protected by acylation.

In the azonolysis reaction to from compounds of structure IX it is not possible to employ as starting compounds those of structure VIII in which there are adjacent hydroxyl groups in the benzene ring containing X, $X_1$ and $X_2$ as substituents, since such structures are susceptible to the oxidation reaction. Adjacent hydroxyl groups may be protected by suitable blocking groups, e.g. as lower alkyl ethers. (However, this provision is not applicable in the case of ozonolysis, since adjacent ether groups are also subject to oxidation in the latter reaction.) Where X, $X_1$ or $X_2$ are alkoxy groups and $R_6$=benzyl, step VII→VIII may be accomplished selectively by hydrogenolysis of the benzyl ether groups. This is the procedure to be employed when X, $X_1$ and $X_2$ include adjacent alkyl ether groups.

Where B is hydroxy is compounds VII this group may be protected for the ozonolysis by forming the acetate thereof. This protective group may be retained for the conversion of adipate II to tetralone III. The hydroxy group is regenerated by hydrolysis. Those skilleded in the art will recognize that those compounds of structure II wherein B is hydroxy may exist in equilibrium with lactone structures, but their presence will not interfere with the disclosed reaction schemes. For convenience, the structures are shown herein and in the appended claims in the non-lactonized form, but they are to be interpreted as embracing the lactones as well.

The herein described compounds of structure I are useful as chelating, complexing, or sequestering agents. The complexes formed with polyvalent metal ions are particularly stable and usually quite soluble in various organic solvents. These properties, of course, render the new compounds useful for a variety of purposes wherein metal ion contamination presents a problem, e.g. in metal extraction ad biological experimentation, as well as in various organic systems such as saturated and unsaturated lubricating oils, hydrocarbons, fatty acids and waxes, wherein metal ion contamination accelerates oxidative deterioration and color formation. They are also useful as metal carriers and in analysis of polyvalent metal ions which may be complexed and extracted by means of these reagents. Other uses common to sequestering agents will also be apparent.

The herein described procedures are adaptable to the introduction of a variety of substituents into the compounds of this invention as follows:

For introduction of aromatic nitro groups, the given compound, e.g. tetralone III, is nitrated by standard procedures, such as treatment with nitric acid-acetic anhydride-acetic acid mixtures, or nitric-sulfuric acid mixtures. Those in which X is halogen, cyano, halo sulfonyl, nitro or other such groups may be prepared by Sandmeyer reaction of the corresponding diazonium salt with suitable salt reagents ($Cu_2Cl_2$, $Cu_2Br_2$, KI, etc.). The diazonium salt is obtained by diazotization of the amino compound, which may in turn be prepared by reduction of the corresponding nitro compound by conventional means, e.g. chemical reduction with active metals (Sn) and mineral acids (HCl) or catalytic hydrogenation, e.g. with nickel catalyst at superatmospheric pressure. Aromatic cyano groups may be further converted to carboxy or carbalkoxy groups where desired by standard hydrolysis and esterification.

The amino group may also be introduced into the benzenoid ring, e.g. in compounds of structure II having a phenolic hydroxyl group, by coupling with arylidiazonium salts such as benzene diazonium chloride or the diazonium salt of p-aminobenzenesulfonic acid, followed by reduction of the resulting phenylazo compound, e.g. by catalytic hydrogenolysis with noble metal catalysts.

Compounds of structure I are prepared from the corresponding starting compounds of structure II represented by structure IIA:

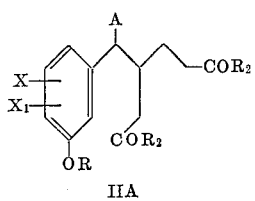

IIA through the sequences represented by II→III→IV→V. In the ring closure reaction to corresponding structure III compounds, it is preferred that one of the benzenoid substituents (X or $X_1$) be para to substituent OR so that the the ring closure reaction proceeds in the position ortho to substituent OR to afford corresponding structure III compounds. If there is no substituent para to OR a halogen group may be introduced by direct halogenation by conventional methods as hereinbefore described. The para halogen substituent may be removed, if desired, by hydrogenolysis, under the usual conditions, of the tetralone resulting from the ring closure.

The ring closure of compounds of structure IIA that have no substituent in the position para to OR, results principally in compounds of the following structure:

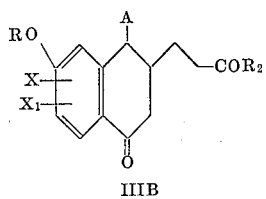

IIIB

Structure IIIB compounds are suitable for conversion to corresponding compounds of structure IV. They also provide an elegant method of introducing a variety of substituents into the position para to substituent OR as follows: the oxime of the tetralone (IIIB) is prepared by conventional methods and then subjected to the Beckman rearrangement ($BF_3$ in acetic acid) to the carboxamide:

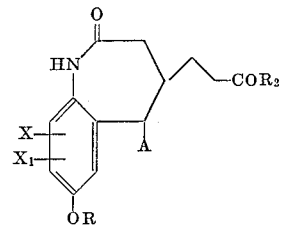

which, on hydrolysis, provides structure IIA compounds with an amino group para to substituent OR. If desired, other substituents may be substituted for the amino group by diazotization and replacement of the diazonium group as previously described.

As has been previously pointed out, normal discretion must be exercised in subjecting certain of the substituted intermediates to the herein described reaction steps. In the base condensation reactions, the presence of a substituent having an active hydrogen (e.g. a hydroxyl or amino group) will necessitate the use of an additional mode of the sodium hydride or other base. The presence of more than one such substituent per molecule is preferably avoided in these reactions, e.g. by the use of protective ether groups as previously described. The same considerations apply to Grignard reactions and hydride reductions. Hydroxyl groups can be subsequently regenerated from their ethers by conventional hydrolytic procedures such as treatment with hydrogen bromide. Similarly, protective benzyl ether groups can subsequently be hydrogenolyzed to obtain hydroxyl groups where desired.

The new tricyclic intermediates of the present invention, in addition to their value in synthesis, are also useful by virtue of their antimicrobial activity, particularly against gram-positive organisms and fungi. They may be employed as bacteriostatic and fungistatic agents, and are further useful in the separation and classification of organisms for medical and diagnostic purposes. Exemplary of these compounds is 2-carbethoxy-5-methoxy-8-chloro-3,4,10-trioxo-1,2,3,4,4a,9,9a,10-octahydroanthracene which shows the following minimum inhibitory concentration (MIC) against the indicated organisms.

| | MIC (mcg./ml.) |
|---|---|
| *Micrococcus pyogenes* var. *aureus* | 1.56 |
| *Streptococcus pyogenes* | 0.19 |
| *Diplococcus pneumoniae* | 6.3 |
| *Erysipelothrix rhusiopathiae* | 6.3 |
| *Corynebacterium diphtheriae* | 6.3 |
| *Bacillus subtilis* | 1.56 |
| *Bacterium ammoniagenes* | 1.56 |
| *Malleomyces mallei* | 12.5 |
| *Vibrio comma* | 3.12 |
| *Pasteurella multocida* | 12.5 |
| *Candida albicans* | 6.3 |

Antibiotic resistant strains of *Micrococcus pyogenes* var. *aureus*:

| | MIC (mcg./ml.) |
|---|---|
| 376 | 0.78 |
| 400 | 3.12 |

2-carbomethoxy - 5 - hydroxy - 8 - chloro-3,4,10-trioxo-1,2,3,4,4a,9,9a,10-octahydroanthracene exhibits antifungal activity as follows:

| | MIC (mcg./ml.) |
|---|---|
| *Trichophyton rubrum* | 1 |
| *Pythium debarynum* | 1 |
| *Aspergillus niger* | 10 |

These minimum inhibitory concentrations are determined by the well-known serial dilution technique.

In view of the foregoing activity, it will be apparent to those skilled in the art that these compounds may be employed in the same manner as known bacteriostatic and fungistatic agents for the purposes outlined hereinbefore.

These new intermediates of structure I, by virtue of their β-diketone structure, are also valuable chelating, complexing or sequestering agents, and form particularly stable and soluble complexes with polyvalent cations. They are therefore useful wherever removal of such polyvalent ions is desired, e.g. in biological experimentation and in analytical procedures. Of course, as is well known to those skilled in the art, such β-diketones may exist in one or more of several tautomeric forms as a result of their ability to enolize. It is fully intended that the β-diketones structures herein employed embrace such tautomers.

The starting compounds of the present invention are readily preparable by known procedures. Many of these compounds, including benzoate and benzophenone starting compounds, have been described in the literature.

The following examples are given by way of illustration and are not to be construed as limitations of this invention, many variations of which are possible within the scope and spirit thereof.

EXAMPLE 1

3,3',4-trimethoxybenzophenone

A mixture of 40 g. of 3-methoxybenzoyl chloride, 32 g. of veratrole and 250 ml. of carbon disulfide in a 3-neck round-bottom flask fitted with reflux condenser and stirrer is cooled to 0° C. Then 40 g. of aluminum chloride is added portionwise to the cooled mixture and the mixture stirred for 45 minutes, after which it is allowed to warm to room temperature. A vigorous reaction ensues with the separation of a yellow precipitate. The mixture is carefully warmed on a steam bath and stirred for 1½ hours. Water is then added to the cooled mixture and the carbon disulfide is steam-distilled. The resultant mixture is then extracted with chloroform and the chloroform layer separated, washed with dilute hydrochloride acid, followed by dilute sodium hydroxide and then dried and concentrated under reduced pressure. The residual oil is distilled to obtain the product, B.P. 216–218° C. at 1.5 mm. mercury. A 65% yield of product is obtained. The viscous product is stirred in absolute methanol and crystallizes, M.P. 85–86° C.

EXAMPLE 2

3,3',4-trimethoxydiphenylmethane

*Method A.*—A solution of 5 g. of 3,3',4-trimethoxybenzophenone in 200 ml. of ethanol containing 1 g. of copper chromium oxide is hydrogenated at 180° C. and 100 atmospheres of hydrogen gas for 1.5 hours. The resultant solution is filtered and concentrated under reduced pressure. The residual oil is distilled to obtain the product, B.P. 192–194° C. at 2.5 mm. mercury. The product crystallizes on standing, the melting point of the crystals being 45–56° C. Elemental analysis gives the following results:

Calcd. for $C_{16}H_{18}O_3$ (percent): C, 74.39; H, 7.02. Found (percent): C, 74.50; H, 7.18.

*Method B.*—This product is also obtained by hydrogenation of the starting compound of Method A using 10% palladium on carbon in ethanol at 50° C. and 40 p.s.i. of hydrogen gas. The hydrogenation procedure is also carried out at room temperature, although the uptake of hydrogen is considerably slower than at 50° C. The product is obtained by filtration and concentration of the hydrogenation mixture.

*Method C.*—Amalgamated zinc is prepared by shaking for 5 minutes a mixture of 120 g. of mossy zinc, 12 g. of mercuric chloride, 200 ml. of water and 5 ml. of concentrated HCl in a round-bottom flask. The solution is decanted and the following reagents added: 75 ml. of water and 175 ml. of concentrated HCl, 100 ml. of toluene and 52 g. of 3,3',4-trimethoxybenzophenone. The reaction mixture is vigorously boiled under reflux for 24 hours. Three 50 ml. portions of concentrated HCl are added at intervals of 6 hours during reflux.

After cooling to room temperature the layers are separated, the aqueous layer diluted with 200 ml. of water and extracted with ether. The ether extract is combined with the toluene layer, dried and concentrated under reduced pressure to obtain the product.

EXAMPLE 3

3,3',4-trihydroxydiphenylmethane

Two grams of 3,3',4-trimethoxydiphenylmethane are dissolved in 10 ml. of acetic acid and 10 ml. of 48% hydrobromic acid and the mixture is refluxed for 5 hours. The reaction mixture is concentrated under reduced pressure to obtain a residual gum which is vacuum-distilled (B.P. 230° C. at 0.5 mm. of mercury). The distillate, a colorless gum, crystallizes. A 62% yield of product is obtained, M.P. 103.5–104° C.

EXAMPLE 4

3-(3-hydroxybenzyl)-hexa-2,4-dienedioic acid

A mixture of 3.5 g. of 3,3',4-trihydroxydiphenylmethane in 50 ml. of acetone and 50 ml. of 10% aqueous sodium hydroxide is cooled to 0° C. Thirty ml. of 35% aqueous hydrogen peroxide solution is then added dropwise, the mixture turning pale pink after 5 to 10 minutes. An exothermic reaction occurs with considerable boiling and foaming. The mixture is allowed to stand for 1 hour and is then extracted with ethyl acetate, the extract being discarded. The aqueous solution is then acidified and extracted with ethyl acetate. Concentration of the ethyl acetate extract after drying gives the product as a gummy residue.

EXAMPLE 5

3-(3-hydroxybenzyl)adipic acid

The product of the preceding example (105 mg.) is dissolved in 13 ml. of ethanol containing 1 drop of concentrated hydrochloric acid and hydrogenated over platinum oxide at 1 atmosphere of hydrogen gas at room temperature. The hydrogen uptake is exactly 2 molecular equivalents.

EXAMPLE 6

3-(3-methoxybenzyl)adipic acid dimethyl ester

The acid product of the preceding example is dissolved in aqueous sodium hydroxide (4 molar equivalents) and agitated with 3 molar equivalents of dimethyl sulfate at 40° C. for 6 hours. The resultant solution is then diluted with water and extracted with chloroform. The chloroform layer is separated, dried and concentrated under reduced pressure to yield an oil, B.P. 205 to 210° C. at 0.2 mm. mercury. This product is also obtained by treatment of the starting compound with diazomethane in diethyl ether.

In a similar manner the corresponding ethyl and propyl esters are prepared.

EXAMPLE 7

3-(3-methoxybenzyl)hexa-2,4-dienedioic acid

Five grams of 3,3',4-trimethoxydiphenylmethane are dissolved in 50 ml. of acetic acid containing about 10 drops of water and ozonized air containing about 4% $O_3$ is then passed into the mixture for 1.5 hours (total of about 6 moles of ozone). The resultant yellow solution is poured into 1 liter of water and extracted with chloroform. The chloroform layer is separated, washed with aqueous sodium bicarbonate solution and concentrated under reduced pressure. The residue is dissolved in ethanol containing 2 g. of KOH and the mixture allowed to stand at room temperature for 2 days after which it is diluted with water and extracted with chloroform. After separation of the chloroform layer the aqueous alkaline solution is acidified with dilute hydrochloric acid and extracted with chloroform. Concentration of the chloroform extract gives the acid product.

The methyl, ethyl and propyl diesters of this acid are prepared by refluxing the acid for 3 days in ethylene dichloride containing the appropriate alcohol and sulfuric acid.

EXAMPLE 8

3-(3-methoxybenzyl)adipic acid dimethyl ester

The ester of the preceding example is hydrogenated in ethanol over 10% palladium on carbon at 1 atmosphere of hydrogen gas at room temperature. The theoretical uptake of hydrogen gas (2 molar equivalents) is very rapid. The product is obtained by filtration and concentration of the hydrogenation mixture.

In similar fashion the corresponding free acid is obtained by hydrogenation of the free acid of the preceding example. It is further purified by conversion to the dimethyl ester, fractional distillation, and hydrolysis, as follows:

A solution of 5432 grams (20.4 mole) of the crude 3-(3-methoxybenzyl)adipic acid, 3410 grams (106.6 mole) methanol, 10.6 liters ethylenedichloride and 106 ml. concentrated sulfuric acid is stirred and refluxed for 15 hours. The mixture is cooled and washed with water (3×5 l.), 5 percent aqueous sodium hydroxide (1×2 l.) and again with water (3×5 l.). The ethylenedichloride solution is dried over 3 lb. anhydrous magnesium sulfate (with 2 lb. Darco C60 activated carbon). The drying agent and carbon are filtered off and the filtrate concentrated at reduced pressure to remove solvent. The residue is distilled through a 3″ x 16″ vacuum-jacketed fractionating column packed with porcelain saddles. After a forerun of 934.1 grams, the product is collected at 172.0° C./0.2 mm. to 183° C./0.35 mm. This amounts to 3076.6 g. of 95 percent pure ester.

The ester, 2943.4 grams (10.00 moles) is hydrolyzed by heating over a steam bath for 19 hours with 1 kg. (25.0 moles) sodium hydroxide in 6 liters of water. The hydrolysis mixture is acidified to a pH ca. 1.0 by addition of concentrated hydrochloric acid and the product is extracted into methylene chloride (1×4 l. and 2×2 l.). The methylene chloride extract is washed with water (1×4 l.+1×8 l.), dried over magnesium sulfate, filtered and freed of solvent by distillation at reduced pressure. This gives 2506 grams of 3-(3-methoxybenzyl)adipic acid in the form of a very sticky oil.

The corresponding diethyl ester is prepared by refluxing this product in ethylene dichloride containing ethanol and sulfuric acid. The diester is obtained by diluting the reaction mixture with water, separating, drying and concentrating the ethylene dichloride layer, and vacuum-distilling the residual oil, $n_D^{25}=1.4973$.

EXAMPLE 9

3,3',4-trimethoxydiphenyl methanol

*Method A.*—A solution of 3,3',4-trimethoxybenzophenone (0.01 mole) in 280 ml. of 1:1 tetrahydrofuran:1,2-dimethoxyethane at a temperature of about −10° C. is treated with a solution of sodium borohydride (0.005 mole) in 30 ml. of 1,2-dimethoxyethane and 10 ml. of water. After 15 minutes, 5 ml. of glacial acetic acid is added and the mixture stirred for 5 minutes. Hydrochloric acid (3 ml. of 6 N) is then added, the mixture stirred for an additional 0.5 hour, then poured into water. The product is recovered by chloroform extraction and evaporation of the chloroform.

*Method B.*—This product is obtained by treating 5 g. 3, 3',4-trimethoxybenzophenone and 2 g. 5% palladium on carbon in ethanol with 40 p.s.i. hydrogen gas at room temperature until one molar equivalent of hydrogen is consumed. The reaction mixture is filtered and concentrated at reduced pressure to obtain the product.

Following the same procedures, 2'-chloro-3,4,5'-trimethoxydiphenylmethanol is prepared from the corresponding benzophenone.

EXAMPLE 10

Acetic acid ester of 3,3',4-trimethoxydiphenylmethanol 3,3',4 - trimethoxydiphenylmethanol, 0.05 mole, dissolved in 0.2 mole anhydrous pyridine, is treated with 0.1 mole acetic anhydride while agitating. The resulting mixture is warmed for 15 minutes at 80° C., poured into ice water, and the product is extracted into chloroform. The chloroform extract is freed of pyridine by washing with 2% hydrochloric acid and then with water, and the product is recovered by evaporation of the chloroform.

Other hydroxy diphenylmethanols are converted to the acetate in the same way. Where the ester separates as a solid from the ice water, it may be separated by filtration and acid-washed as before. Where free hydroxyl groups are present on the aromatic rings, these too will be acetylated. Where amino or other basic groups are present, the acid wash is eliminated and the pyridine removed from the product by evaporation under high vacuum.

EXAMPLE 11

Dimethyl 3-(α-hydroxy-3-methoxybenzyl)adipate

The acetate ester of 3,3',4-trimethoxydiphenylmethanol, 5 grams, is subjected to the ozonolysis of Example 7. The residue obtained by concentration of the chloroform extract in that procedure is hydrogenated in acetic acid solution employing palladium on carbon catalyst. When three molar proportions of hydrogen have been consumed the reaction mixture is filtered and concentrated to obtain the product.

3-(α-hydroxy-3-methoxybenzyl)adipic acid is prepared by subjecting 3,3',4-trimethoxydiphenylmethanol to the procedures of Examples 4 and 5.

EXAMPLE 12

3-(3,4-dimethoxybenzyl)adipic acid 3,4 - dimethoxy - 3',4' - dibenzoxydiphenyl methane is treated in acetic acid with hydrogen at room temperature, employing 5% palladium on carbon as catalyst. As soon as a molar proportion of hydrogen has been consumed for each benzoxy substituent, the reaction mixture is filtered and concentrated to obtain 3,4-dimethoxy-3',4'-dihydroxydiphenyl methane as residue. The latter is oxidized with hydrogen peroxide by the procedure of Example 4 and reduced by the procedure of Example 5 to obtain the desired product.

EXAMPLE 13

α-(2-chloro-5-methoxyphenyl)-α-(3,4-dimethoxyphenyl)ethanol

To a solution of 2'-chloro-3,4,5'-trimethoxybenzophenone in dimethoxyethane is added dimethoxyethane solution containing a molar equivalent of methyl magnesium bromide. After standing for 30 minutes, the reaction mixture is acidified cautiously with ice and aqueous 6 N HCl, and extracted with methylene chloride. The extracts are combined, washed with water, dilute aqueous sodium bicarbonate and water, dried and concentrated under reduced pressure to obtain the product.

EXAMPLE 14

α-(2-chloro-5-methoxyphenyl)-α-(3,4-dimethoxyphenyl)ethane

The title product of Example 13, 2 g., is dissolved in 150 ml. of glacial acetic acid and hydrogenated at a pressure of 40 p.s.i. of hydrogen gas for 24 hours at room temperature in the presence of 2 g. of 5% palladium-on-carbon catalyst. The mixture is filtered and then concentrated to obtain the product as residue.

EXAMPLE 15

Compounds of Structure VIII are oxidized using ozone according to the method of Example 7 to obtain acids of the formula:

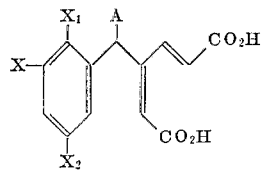

| X | X₁ | X₂ | A |
|---|---|---|---|
| H | H | H | H |
| H | Et | OMe | H |
| H | NMe₂ | OMe | H |
| H | NHAc | OMe | H |
| H | Me | OH | H |
| i-Pr | H | OH | H |
| Et | Et | OH | H |
| H | H | OBz | H |
| H | H | OCOEt | H |
| H | H | OCOMe | H |
| H | H | OH | H |
| NHAc | H | OMe | H |
| Et | H | OMe | H |
| Me | H | OMe | H |
| NMe₂ | H | OH | H |
| Me | Me | H | H |
| H | Pr | OPr | H |
| H | H | OMe | Me |
| H | H | OMe | Et |
| H | H | OMe | Pr |
| Me | Me | OH | H |
| H | H | OH | Me |
| H | H | OH | i-Pr |
| Me | H | OH | Me |
| H | H | OMe | H |
| H | H | OMe | Et |
| OMe | H | H | Et |
| OMe | H | H | H |
| OMe | H | H | Me |
| OMe | H | H | Pr |
| OH | H | H | H |
| OH | H | H | Me |
| OH | H | H | i-Pr |
| OCOMe | H | H | J |
| OCOEt | H | H | H |
| H | Et | OH | H |
| OBz | H | H | H |
| H | H | OBz | H |

In the above table, Me=CH₃; Et=C₂H₅; Pr=C₃H₇; Ac=acetyl; Bz=benzyl.

These acids are converted to corresponding lower alkyl or benzyl esters by conventional procedures and also reduced to adipates by the procedures of Examples 5 and 8.

In the case of both oxidation procedures the acidification is effected by means of acetic acid and the product is extracted into n-butanol and recovered therefrom by evaporation.

EXAMPLE 16

Benzyl adipic acids and esters

Compounds of the formula

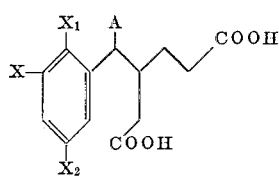

are prepared by the procedures of Examples 1–8, avoiding the procedure of Example 7 for products having adjacent alkoxy substituents. The procedure of Example 12 is followed for products having adjacent alkoxy substituents.

| X | X₁ | X₂ | A |
|---|---|---|---|
| H | H | H | H |
| H | Et | OH | H |
| H | Cl | OMe | H |
| H | NMe₂ | OMe | H |
| H | NHAc | OMe | H |
| H | H | OH | H |
| Me | H | OH | H |
| Me | Me | OH | H |
| H | Me | OH | H |
| NMe₂ | H | OH | H |
| Me | Me | H | H |
| OMe | H | OMe | H |
| i-Pr | H | OH | H |
| Et | Et | OH | H |
| H | H | OBz | H |
| H | Cl | OBz | H |
| H | H | OCOEt | H |
| H | H | OCOMe | H |
| H | Et | OMe | H |
| OH | H | H | H |
| OBz | H | H | H |
| OCOEt | H | H | H |
| OCOMe | H | H | H |
| H | NH₂ | OMe | H |
| H | Pr | OPr | H |
| CF₃ | CF₃ | OMe | H |
| OBu | CF₃ | OBu | H |
| NHEt | CF₃ | OMe | H |
| NHCOPr | H | H | H |
| H | CF₃ | OH | H |
| H | Cl | OH | H |
| Me | Cl | OH | H |
| i-Pr | Cl | OH | H |
| NH₂ | Cl | OMe | H |
| Me | Cl | OMe | H |
| Et | Cl | OMe | H |
| NHMe | H | OPr | H |
| NH₂ | H | OBz | H |
| NHAc | H | OH | H |
| OH | Cl | OH | H |
| CF₃ | H | OH | H |

The corresponding diesters are prepared by esterification of those compounds with the selected alcohol by the usual method.

Compounds having a benzolyloxy substituent are reduced by the procedure of Method C of Example 2. Of course, this procedure results in hydrolysis of any ester groups and necessitates re-esterification.

EXAMPLE 17

Alpha-hydroxybenzyl adipic acids and esters corresponding to the products of Example 16 are prepared by the procedures of Examples 9–12, avoiding ozonolysis in the case of products having adjacent alkoxy substitutes in the aromatic ring.

EXAMPLE 18

Products having the formula

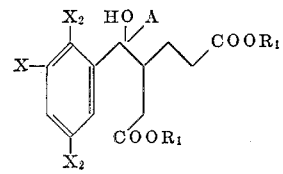

are prepared from the appropriately substituted α,α-diphenyl alkanoles by the procedures of Examples 10 through 12.

The diphenyl alkanols for these sequences are prepared by the procedure of Example 13, employing an additional mole of Grignard reagent for each mole of active hydrogen, where such is present in the benzophenone starting compound. Compounds containing an amino substituent are isolated from the reaction mixture by the substitution of saturated aqueous ammonium chloride for the 6 N HCl in the procedure of Example 13.

| X | $X_1$ | $X_2$ | A | $R_1$ |
|---|---|---|---|---|
| H | H | H | Me | Et |
| H | Et | OH | Me | Et |
| H | Cl | OMe | Me | Me |
| H | NMe₂ | OMe | Me | Me |
| H | NH₂ | OMe | Me | Me |
| H | NHAc | OMe | Et | Me |
| H | H | OH | Me | Et |
| Me | H | OH | Me | Et |
| OMe | H | OMe | Me | Et |
| OMe | H | H | Me | Et |
| OMe | H | H | Et | Et |
| H | Cl | OMe | Et | Et |
| H | Cl | OMe | Pr | Et |
| H | H | OMe | Me | Et |
| H | H | OMe | Et | Et |
| H | H | OMe | Pr | Et |
| OCOMe | Cl | OEt | Et | Me |
| H | CF₃ | H | Me | Et |
| H | CF₃ | OMe | Me | Et |
| H | H | OEt | Me | Bz |

EXAMPLE 19

3-[α-(2-chloro-5-methoxyphenyl)ethyl]adipic acid diethyl ester

3-[α-hydroxy-α-(2-chloro-5-methoxy-phenyl)ethyl] adipic acid diethyl ester, 2 g., is dissolved in 150 ml. of glacial acetic acid and hydrogenated at a pressure of 40 p.s.i. of hydrogen gas for 24 hours at room temperature in the presence of 2 g. of 5% palladium-in-carbon catalyst. The mixture is filtered and then concentrated. The product is obtained by vacuum distillation of the residue.

EXAMPLE 20

The α-hydroxy group of Example 18 compounds is hydrogenolyzed according to the method of Example 19 to afford the following compounds:

diethyl 3-(α-phenethyl)adipate
diethyl 3-[α-(2-ethyl-5-hydroxyphenyl)ethyl]adipate
dimethyl 3-[α-(2-chloro-5-methoxyphenyl)ethyl]adipate
dimethyl 3-[α-(2-dimethylamino-5-methoxyphenyl) ethyl]adipate
dimethyl 3-[2-amino-5-methoxyphenyl)ethyl]adipate
dimethyl 3-[α-(2-acetamido-5-methoxyphenyl)propyl] adipate
diethyl 3-[α-(3-hydroxyphenyl)ethyl]adipate
diethyl 3-[α-(3-methyl-5-hydroxyphenyl)ethyl]adipate
diethyl 3-[α-(3,5-dimethoxyphenyl)ethyl]adipate
diethyl 3-[α-(3-methoxyphenyl)propyl]adipate
diethyl 3-[α-2-chloro-5-methoxyphenyl)propyl]adipate
diethyl 3-[α-2-chloro-5-methoxyphenyl)butyl]adipate
diethyl 3-[α-3-methoxyphenyl)ethyl]adipate The compounds of the table, and the corresponding adipic acids, are alternatively prepared from the appropriately substituted α,α-diphenyl alkanes by the procedures of Examples 4 through 8, observing the precautions summarized in Example 16. In this case, the necessary diphenyl alkanes are prepared by successively applying the procedures of Example 13 and Example 14 to the corresponding benzophenones.

EXAMPLE 21

Dimethyl 3-(2-chloro-5-methoxybenzyl)adipate

*Method A.*—A mixture of 3.2 g. of dimethyl 3-(3-methoxybenzyl)adipate and 1.4 g. of N-chlorosuccinimide in 30 ml. of trifluoracetic acid is stirred and heated on a steam bath for 30 minutes. The reaction mixture is then poured into 5% aqueous sodium bicarbonate with stirring, and the mixture extracted with ether. The combined extracts are dried over anhydrous sodium sulfate and then concentrated under reduced pressure to an oil which is vacuum-distilled to obtain the product, B.P. 200° C. (1.1 mm. Hg).

*Method B.*—A mixture of 3.2 g. of dimethyl 3-(3-methoxybenzyl)adipate and 2.1 g. of phosphorus pentachloride in 100 ml. of dry benzene is refluxed for 30 minutes. The reaction mixture is carefully poured into ice and water, the benzene layer separated, washed with water and dried. Concentration of the dried benzene solution under reduced pressure yields an oil which is vacuum-distilled to obtain the product.

Similarly, the diethyl, dibenzyl and dipropyl chloroesters are prepared.

*Method C.*—A solution of 1688 g. of 3-(3-methoxybenzyl)adipic acid and 50 mg. of iodine in 9 liters of glacial acetic acid is stirred while a solution of 450 g. of chlorine in 8 liters of glacial acetic acid is added during about 2 hours. The mixture is kept in the dark during the procedure and the temperature maintained at 10°-15° C. The solvent is then removed by concentration under reduced pressure to give 1902 g. of a dark amber oil.

This procedure is repeated with ferric chloride in lieu of iodine with comparable results.

*Method D.*—A mixture of 30.4 g. of diethyl 3-(3-methoxybenzyl)adipate and 12.75 g. of sulfuryl chloride in 250 ml. of benzene is allowed to stand for 3 days at room temperature. At the end of this period, the reaction mixture is concentrated under reduced pressure to a gummy residue which is vacuum-distilled to obtain the product.

*Method E.*—The procedure of Method B is repeated using as starting compound the corresponding dicarboxylic acid to obtain 3-(2-chloro-5-methoxybenzyl) adipic acid dichloride.

EXAMPLE 22

Diethyl 3-(2-chloro-5-ethoxybenzyl)adipate

This product is obtained by the procedure of Method A of Example 21 employing diethyl 3-(3-ethoxybenzyl) adipate in lieu of dimethyl 3-(3-methoxybenzyl)adipate.

EXAMPLE 23

2-(2-carbethoxyethyl)-5-methoxy-8-chloro-4-tetralone

*Method F.*—A mixture of 2 g. of diethyl-3-(2-chloro-5-methoxybenzyl)adipate (Example 21) and 30 g. of polyphosphoric acid is heated on a steam bath for 30 minutes and then poured into ice water. The oil then separates and is collected.

*Method B.*—A mixture of 2.0 g. of the di-acid chloride of 3-(2-chloro-5-methoxybenzyl)adipic acid in 30 ml. of carbon disulfide is cooled to 0° C. and 4 g. of aluminum chloride added portionwise to the cooled mixture. The mixture is stirred for 30 minutes and then allowed to warm to room temperature where a vigorous reaction ensues. After the vigorous reaction subsides the mixture is warmed on a steam bath, cooled, diluted with water and the carbon disulfide steam distilled. The mixture is extracted with chloroform and the product obtained by drying and concentrating the chloroform extract. The product is the free acid which, if desired, is converted to the desired lower alkyl ester by conventional methods. For example, the methyl ester is prepared as follows:

A mixture of 2002 g. (7.1 moles) of the tetralone acid, 3 l. chloroform, 682 g. (21.3 mole) methanol and 21.2 ml. concentrated sulfuric acid is refluxed with stirring on a steam bath for 20 hours. The reaction mixture is then chilled and 2 l. each of chloroform and water are added. The organic phase is separated and washed successively with 2 × 2 l. water, 1 × 1 l. 2% aqueous sodium hydroxide and 3 × 4 l. water to a final pH of about 7.5. After drying over anhydrous sodium sulfate and treatment with Darco KB activated carbon the solution is filtered and concentrated to a dark oil at reduced pressure. The oil is taken up in 6 l. hot ethyl acetate and 11 l. hexane added. The solution is chilled to −5° C. with stirring and 1404 g. 2-(2-carbomethoxyethyl)-5-methoxy-8-chloro-4-tetralone recovered by filtration, hexane-washing and air-drying. The product melts at 101.0–102.4° C.

EXAMPLE 24

2-(2-carboxyethyl)-5-methoxy-8-chloro-4-tetralone

A mixture of 2 g. of 3-(2-chloro-5-methoxybenzyl)-adipic acid in 25 ml. of liquid hydrogen fluoride is allowed to stand overnight at room temperature. After evaporation of the hydrogen fluoride, the solid residue is recrystallized from aqueous methanol to yield white crystalline product, M.P. 177.5–178° C. Elemental analysis gives the following results:

Calc'd for $C_{14}H_{15}O_4Cl$ (percent): C, 59.47; H, 5.35; Cl, 12.54. Found (percent): C, 59.51; H, 5.42; Cl, 12.60.

In a repeat experiment on an increased scale, a polyethylene container is charged with 1809 g. (6.03 mole) 3-(2-chloro-5-methoxybenzyl)adipic acid and chilled in an ice bath while 7 kg. liquid hydrogen fluoride is introduced from an inverted, chilled tank. The mixture is swirled to make it homogeneous and then left to evaporate partially overnight in a hood. Most of the hydrogen fluoride that remains is removed by placing the polyethylene container in warm water to cause rapid evaporation. The remainder is removed by quenching in about 10 l. water. The product is then extracted into chloroform, washed with water and dried over magnesium sulfate. Removal of the drying agent by filtration and the solvent by distillation gives a gum that is triturated with ether and filtered. This gives 1031 g. of crude product that is recrystallized from a mixture of 16 l. ethanol, 2 l. acetone and 1 l. ethylene dichloride, with activated carbon treatment. The first two crops amount to 863.9 g. of white crystalline product melting at 175.0–180.5° C.

Ultraviolet absorption shows λ max. at 223 mμ (ε=24,650), 255 mμ (ε=7,900) and 326 mμ (ε=4,510).

This product is also obtained by hydrolysis of the product of Method A, Example 23, by treatment with HCl in acetic acid.

The methyl ester, ethyl ester (M.P. 57–59° C.) and benzyl ester (M.P. 84–85° C.) are prepared by conventional methods.

3-(3-methoxybenzyl)adipic acid, treated with HF as described, yields 2-(2-carboxyethyl)-7-methoxy-4-tetralone, which melts at 158–9° C. after two recrystallizations from benzene-hexane and exhibits ultraviolet absorption maxima at 225 mμ (ε=13,500) and 276 mμ (ε=16,000) in methanolic HCl and NaOH.

*Analysis.*—Calc'd for $C_{14}H_{16}O_4$ (percent): C, 67.73; H, 6.50. Found (percent): C, 67.67; H, 6.48.

EXAMPLE 25

2-(2-carbomethoxyethyl)-5-methoxy-4-tetralone 2-(2-carbomethoxyethyl)-5-methoxy-8-chloro-4-tetralone (1.5 g.) is combined with 5% palladium-on-charcoal (0.37 g.), triethylamine (0.5 g.) and methanol 270 ml. in a standard Parr hydrogenation bottle and subjected to 50 pounds of hydrogen pressure. The absorption of hydrogen levels off at approximately one molar equivalent. The catalyst is filtered off, the solution taken to dryness, and triethylamine hydrochloride is removed by washing with water. The residual white solids weigh 1.1 g. and melt at 63–66° C. After two recrystallization from hexane and one from ether the product melts at 85–87°.

*Analysis.*—Calc'd for $C_{16}H_{18}O_4$ (percent): C, 68.68; H, 6.92. Found (percent): C, 68.59; H, 6.98.

EXAMPLE 26

2-(2-carboxyethyl)-7-hydroxy-4-tetralone 3-(3-methoxybenzyl)adipic acid, 22.46 g., is heated at reflux with hydriodic acid (specific gravity 1.5) for 3 hours and the methyl iodide formed is separated. The solution is evaporated in vacuo and the resulting gum triturated with cold water to yield 14.7 g. of yellow crystalline product. Dried and recrystallized from aqueous acetone the product is obtained in the form of white crystals melting at 183.5–185.5° C.

*Elemental analysis.*—Calculated for $C_{13}H_{14}O_4$ (percent): C, 66.65; H, 6.02. Found (percent): C, 66.60; H, 6.02.

The same product is obtained by refluxing a mixture of 0.5 g. of the 3-(3-methoxybenzyl)adipic acid with 25 ml. 48% HBr for 18 hours, then pouring the reaction mixture into 3 volumes of water, and filtering the resulting 0.4 g. of crystalline precipitate.

EXAMPLE 27

2-(2-carbomethoxyethyl)-5-methoxy-8-nitro-4-tetralone

One gram of the Example 25 product is slowly added to 10 ml. of concentrated sulfuric acid containing 2 ml. of 70% nitric acid at a temperature of 0°–5° C. The solution is stirred for 15 minutes and allowed to warm to room temperature. The mixture is poured into ice-water mixture and extracted with chloroform, the chloroform layer separated, dried and concentrated to obtain the product.

EXAMPLE 28

The following compounds are prepared according to the methods of Example 24 by ring closure of corresponding compounds.

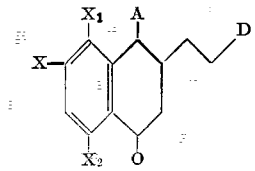

| X | $X_1$ | $X_2$ | A | D |
|---|---|---|---|---|
| H | H | H | H | $CO_2Et$ |
| H | Et | OMe | H | CN |
| H | $NMe_2$ | OMe | H | $CO_2Et$ |
| H | $NH_2$ | OMe | H | $CO_2Bz$ |
| H | NHAc | OMe | H | $CO_2Pr$ |
| Me | Cl | OH | H | $CO_2Et$ |
| i-Pr | Cl | OH | H | $CO_2Et$ |
| Et | Et | OH | H | $CO_2Et$ |
| H | Cl | OBz | H | $CO_2Pr$ |
| H | Cl | OH | H | $CO_2Bu$ |
| $NH_2$ | Cl | OMe | H | $CO_2Bz$ |
| Et | Cl | OMe | H | $CO_2Bz$ |
| Me | Cl | OMe | H | $CO_2Bz$ |
| $NMe_2$ | Cl | OH | H | $CO_2H$ |
| Me | Me | H | H | $CO_2H$ |
| H | Cl | OMe | Me | $CO_2H$ |
| H | Cl | OMe | Et | $CO_2H$ |
| H | Cl | OMe | Pr | $CO_2H$ |
| H | Me | OH | H | $CO_2H$ |
| Me | Me | OH | H | $CO_2H$ |
| H | Cl | OH | Pr | $CO_2H$ |
| H | Me | OMe | H | CN |
| Me | Cl | OMe | H | $CO_2H$ |
| OMe | H | OH | H | $CO_2Et$ |
| H | Cl | OH | Me | $CO_2H$ |
| i-Pr | H | OH | H | $CO_2Bz$ |
| H | $NH_2$ | OBz | H | $CO_2Me$ |
| H | Pr | OPr | H | $CO_2Me$ |
| H | H | OH | H | $CO_2Me$ |
| H | H | OMe | Me | $CO_2Me$ |
| H | H | OMe | Et | $CO_2Me$ |
| H | H | OMe | Pr | $CO_2Me$ |
| H | H | OMe | H | $CO_2Bz$ |
| H | H | OH | Me | $CO_2H$ |
| H | H | OH | Et | $CO_2H$ |
| H | H | OH | Pr | $CO_2H$ |
| OCOMe | Cl | OEt | Et | $CO_2Me$ |
| $CF_3$ | $CF_3$ | OH | H | $CO_2Me$ |
| OBu | $CF_3$ | OBu | H | $CO_2Et$ |
| NHEt | $CF_3$ | OMe | H | $CO_2Et$ |
| NHCOPr | H | H | H | $CO_2Me$ |
| H | $CF_3$ | OH | H | $CO_2Bz$ |
| OH | Cl | OH | H | $CO_2Et$ |
| NHAc | H | OH | H | $CO_2Et$ |
| $CF_3$ | H | OH | H | $CO_2Et$ |
| OH | H | H | Me | $CO_2Et$ |
| H | H | OBz | H | $CO_2Bz$ |
| $NH_2$ | H | OMe | H | $CO_2Bz$ |
| Pr | H | OMe | H | $CO_2Bz$ |
| Me | H | OMe | H | $CO_2Bz$ |
| $NMe_2$ | H | OH | H | $CO_2Bz$ |
| H | $CF_3$ | H | H | $CO_2Bz$ |
| Et | H | OMe | H | $CO_2Bz$ |
| OMe | Cl | H | H | $CO_2Bu$ |
| NHAc | Cl | OMe | H | $CO_2Me$ |
| H | $CF_3$ | H | Me | $CO_2Me$ |
| H | $CF_3$ | OMe | Me | $CO_2Et$ |
| H | H | OEt | Me | $CO_2Bz$ |
| H | Me | OMe | H | $CO_2Bz$ |
| H | Cl | OCOEt | H | $CO_2Et$ |
| H | Cl | OCOMe | H | $CO_2Et$ |
| i-Pr | H | OMe | H | $CO_2Bz$ |
| OCOMe | H | H | H | $CO_2Me$ |
| OCOEt | H | H | H | $CO_2Me$ |

TABLE—Continued

| X | X¹ | X₂ | A | D |
|---|---|---|---|---|
| OBz | H | H | H | CO₂Et |
| Me | H | OH | H | CO₂Pr |
| H | Cl | OBz | H | CO₂Me |
| NHMe | H | OPr | H | CO₂Bu |

The aromatic chloro compounds can be subsequently hydrogenolyzed to the corresponding deschloro compounds by the procedure of Example 25.

Those compounds of the above list which contain no amino or hydroxy, groups are also prepared by the methods of Example 23.

EXAMPLE 29

2-(2-carboxyethyl)-5-hydroxy-8-amino-4-tetralone

One molecular proportion of aniline is dissolved in 2 N HCl, employing about 20 ml. thereof per gram of aniline, and the solution treated with one molecular proportion of NaNO₂ at 0° to 10° C. The benzenediazonium chloride solution is then mixed with stirring at 0° to 20° C. with an aqueous solution of 2-(2-carboxyethyl)-5-hydroxy-4-tetralone sodium salt and sufficient sodium carbonate to neutralize the excess HCl in the diazotized aniline solution. The pH of the solution is in the range 8–10. Stirring is continued at 0° C. for approximately two hours after which careful neutralization of the reaction mixture yields the 8-phenylazo compound. The product is collected on a filter, washed and dried.

One part by weight of 2-(2-carboxyethyl)-5-hydroxy-8-phenylazo-4-tetralone is mixed with 20 parts by weight of methanol and ⅕ part by weight of 5% palladium-on-carbon catalyst is added to the mixture which is then hydrogenated at 30–45 p.s.i. of hydrogen gas in a conventional shaker apparatus at 30° C. until two molar equivalents of hydrogen are taken up.

After filtration the product is recovered by high vacuum distillation of the residue obtained by removal of the solvent in vacuo, care being exercised to protect the amino phenol from air. It can be stabilized by acetylation, as follows:

The crude amine is placed in 20 parts water containing one molar equivalent of HCl, and 2.2 molar equivalents of acetic anhydride are added.

Sufficient sodium acetate is then added to neutralize the HCl and the solution is warmed to 50° C. After 5 minutes the mixture is cooled and the crude acetate separated by filtration. The solid is then dissolved in cold 5% sodium carbonate solution and reprecipitated with 5% HCl. The 2-(2-carboxyethyl)-5-hydroxy-8-acetamido-4-tetralone obtained in this manner is a preferred form of the amino compound for further reaction sequences.

EXAMPLE 30

3-(2-amino-5-hydroxybenzyl)adipic acid

The procedure of Example 29 is repeated using 3-(3-hydroxybenzyl)adipic acid as starting compound to obtain this product. It may be converted to the product of Example 29 by the ring closure procedure of Example 24.

EXAMPLE 31

3-(2-chloro-5-hydroxybenzyl)adipic acid

Three parts by weight of the product of Example 30 (obtained by evaporating the methanol) is protected from air, immediately mixed with 10 parts by weight of 10% aqueous hydrochloric acid at 0° C., and diazotized by gradual addition of 20% aqueous sodium nitrite solution. Addition of sodium nitrite is continued until a positive starch iodide test on a few drops of the reaction mixture is obtained in the conventional fashion. The resulting solution is then added to 15 parts of a boiling 10% solution of cuprous chloride in aqueous hydrochloric acid. The mixture is boiled for 10 minutes and allowed to cool. The product separates from the cooled mixture and is collected in the conventional manner.

EXAMPLE 32

2-(2-carbomethoxyethyl)-5-benzyloxy-8-chloro-4-tetralone 2-(2-carboxyethyl)-5-methoxy-8-chloro-4-tetralone (25 g.), glacial acetic acid (200 ml.) and 48% hydrobromic acid (50 ml.) are heated at 90° C. under nitrogen for 24 hours. The cooled solution deposits a crystalline solid. The mixture is poured over two parts ice and the total solid crop isolated by filtration and thoroughly washed with water. The crude 2-(2-carboxyethyl)-5-hydroxy-8-chloro-4-tetralone obtained in this way is recrystallized from acetonitrile to obtain 18.8 g. melting at 164–8° C.

*Elemental analysis.*—Calcd. for $C_{13}H_{13}ClO_4$ (percent): C, 58.11; H, 4.88; Cl, 13.20. Found (percent): C, 57.99; H, 4.87; Cl 12.73.

14.5 g. of this product is placed in 200 ml. dry methanol and the mixture refluxed for 30 minutes as anhydrous HCl is passed through. The now clear yellow solution is allowed to stand overnight and the methanol is then removed in vacuo. The residual gum is extracted exhaustively with hexane and the combined extracts are concentrated and cooled. 11.8 g. of the white crytsalline methyl ester separate ond is filtered of and recrystallized from hexane. The ester melts at 68–69.5° C. and analyzes as follows:

Calcd. for $C_{14}H_{15}ClO_4$ (percent): C, 59.45; H, 5.35; Cl, 12.6. Found (percent): C, 59.16; H, 5.38; Cl, 12.6.

5.6 (0.02 mole) of this substance is dissolved in 500 ml. anhydrous methanol and to this is added 0.02 mole sodium methoxide and 500 ml. benzene. The mixture is concentrated to dryness in vacuo at room temperature, then heated at 100° C. and 0.1 mm. for 10 minutes. The residue is maintained under high vacuum at room temperature for 16 hours, and the dry solid added to 50 ml. benzyl bromide together with sufficient dimethyl formamide to solubilize. The mixture is heated at 100° C. for 48 hours with stirring, then cooled and filtered. The filtrate is concentrated at reduced pressure and the residual oil chromatographed on acetone-washed and dried silicic acid in chloroform. The first effluent fraction consists of unchanged starting material. The main fraction, recognized by a negative ferric chloride test, deposits crystalline 2-(2-carbomethoxy ethyl) - 5-benzyloxy-8-chloro-4-tetralone on standing.

EXAMPLE 33

2-(2-cyanoethyl)-5-methoxy-8-chloro-4-tetralone

2 - (2 - carboxyethyl)-5-methoxy-8-chloro-4-tetralone, prepared as in Example 24, 25 g., is dissolved in 455 ml. chloroform and to this is added 12 ml. triethylamine followed by 10 ml. ethyl chloroformate. The temperature rises to 35° C. in about 5 minutes and the introduction of anhydrous ammonia is then begun and continued for one hour. At the end of this time 19 g. of 2-(2-carboxamidoethyl)-5-methoxy-8-chloro-4-tetralone is recovered in the form of a crystalline precipitate melting at 193–8° C., by filtration and water-washing. A second crop (5.1 g.) of less pure product melting at 184–192° C. is also recovered. After recrystallization from dioxane the pale yellow crystals melt at 199–201° C.

10 g. of this amide are dissolved in 100 ml. pyridine and 24 g. p-toluenesulfonyl chloride added. After stirring at room temperature for 18 hours the clear yellow solution is poured into a liter of chloroform and washed successively with water, 3 N HCl, and brine. The dried solution is evaporated to obtain 8.1 g. pale yellow crystalline product melting at 105–107.1° C. Recrystallization from ethyl acetate gives 6.6 g. melting at 107–109° C.

EXAMPLE 34

Lactam of 3-(2-amino-5-methoxybenzyl)adipic acid

A solution of 7.54 g. of the oxime of 7-methoxy-4-tetralone-2-propionic acid in 125 ml. acetic acid is saturated with boron trifluoride. The temperature rises to 139° C., and the color becoming dark green. The mixture is then cooled and poured slowly into 1 liter of cold 10% aqueous sodium hydroxide, and additional sodium hydroxide solution is added to basic pH. The salt is filtered off, and the filtrate extracted with chloroform. The filtrate is then acidified with concentrated hydrochloric acid and again extracted with chloroform. The chloroform layers are combined and stripped at reduced pressure. The resulting residue is triturated with ether-ethyl acetate, filtered and washed with ether to obtain 4.6 g., M.P. 190–205° C. Recrystallization from chloroform-benzene gives a melting point of 188–189.5° C. Elemental analysis agrees with the calculated values.

The starting compound, 7-methoxy-4-tetralone-2-propionic acid, is prepared from 3-(3-methoxybenzyl)adipic acid by dissolving in liquid hydrogen fluoride (1 g. in 20 ml.) and allowing to stand for 12 hours. The product is obtained as residue after evaporation of the HF. The oxime of the tetralone is prepared by standard procedures.

The lactam ethyl ester is prepared by refluxing the product of this example for 15 hours in 500 ml of chloroform containing 0.5 ml. of concentrated $H_2SO_4$ and 7 ml. of ethanol. The product is recrystallized from chloroform-ethyl acetate, first removing chloroform-insoluble material. Several recrystallizations from chloroform-hexane and finally from ethanol give product melting at 128–129.5° C. Elemental analysis agrees with the calculated values.

EXAMPLE 35

3-(2-amino-5-methoxybenzyl)adipic acid

The lactam of the previous example is refluxed under nitrogen for 12 hours in 6 N hydrochloric acid (1 g./20 ml.). The reaction mixture is cooled to 50° C. and a 20 mole-percent excess of acetic anhydride is added with stirring, followed by a 10 mole-percent excess of aqueous sodium acetate. The mixture is stirred and cooled to obtain the acetylated product, which is filtered and dried.

The acetylated product is then converted to 5-methoxy-8-acetamido-4-tetralone-2-propionic acid by treatment with liquid HF.

EXAMPLE 36

2-carbomethoxy-5-methoxy-8-chloro-3,4,10-trioxo-1,2,3,4,4a,9,9a,10-octahydroanthracene

*Method A.*—30 grams of 2-(2-carbomethoxyethyl)-5-methoxy-8-chloro-4-tetralone (0.1 mole), is dissolved together with 24 g. dimethyloxalate (0.2 mole) by warming with 135 ml. freshly distilled dimethyl formamide in a well-dried 2 liter flask which has been flushed with dry nitrogen. The solution is cooled to 20° C. and to it is added all at one time 0.4 mole sodium hydride in the form of a 50% oil dispersion which has been exposed to the atmosphere for 24 hours in order to produce a deactivating coating. The reaction mixture is maintained at 20–25° C. with an ice bath. 0.1 mole dry methanol is now added, and the temperature rises spontaneously to 40–50° C. When the temperature begins to fall (about 5 minutes after addition to the methanol) the reaction vessel is removed from the ice bath and quickly placed in an oil bath at 110° C. The reaction temperature is brought with dispatch to 90° C. and maintained there for 10 minutes, or until active bubbling ceases if this occurs sooner.

The flask is now immediately transferred back to the ice bath, and when the temperature reaches 15° C., 100 ml. of glacial acetic acid is added at such a rate that the temperature does not exceed 30° C. At this point, a golden yellow precipitate appears. 150 ml. methanol and 50 ml. water are added and the mixture is digested at 45° C. for 15 minutes and then stirred in an ice bath for an hour. If only a scanty crop of crystals is present at this time the mixture may be stored in the refrigerator overnight before proceeding. It is now transferred to a separatory funnel to permit separation of the oil from the sodium hydride oil dispersion. The suspension is then filtered with suction, and the filter cake triturated three times with 100 ml. portions of hot hexane to extract impurities. The washed solid is next stirred with 200 ml. water, filtered, and then digested with 500 ml. refluxing methanol for 20 minutes, to effect further purification. 15–16 grams of bright yellow needles are obtained. The product melts at 200–205 C. and exhibits no carbonyl absorption below 6μ. In 0.01 N methanolic HCl it exhibits ultraviolet absorption maxima at 406 mμ ($\epsilon$=14,200) and at 275–290 mμ ($\epsilon$=5,940). In 0.01 N methanolic NaOH it exhibits maxima at 423 mμ ($\epsilon$=13,950) and at 340 mμ ($\epsilon$=7,120).

*Method B.*—Clean sodium metal (3.68 g.) is dissolved in methanol (50 ml.) and the solution evaporated to a dry white solid in vacuo (this is most successfully carried out by using rotary vacuum equipment. Dimethyl oxalate (9.44 g.) and benzene (100 ml.) are then added to the flask and refluxing is carried out for about 10 minutes under nitrogen (not all of the solids dissolve but the cake is broken up). The solution is cooled and dimethylformamide (50 ml.) then added, followed by the dropwise addition of a solution of 2 - (2 - carboxyethyl)-5-methoxy-8-chloro-4-tetralone (11.3 g.) in dimethylformamide (100 ml.) during one hour at 20° C. under $N_2$ with stirring, and stirring at room temperature under nitrogen is continued overnight. The solution is then poured into cold water (1 liter) and extracted twice with chloroform. The chloroform extract is discarded and the aqueous solution acidified with 10% HCl solution. The product is obtained by extraction with chloroform (3×200 ml.), back-washing once with water, drying over anhydrous $Na_2SO_4$, treatment with charcoal, filtration and evaporation of the solvent in vacuo to give a red gum (16.4 g.) which is 2-(2-carboxyethyl) - 3 - methyloxalyl - 5-methoxy-8-chloro-4-tetralone. U.V. absorption maxima in 0.01 N NaOH at 248 and 363 mμ. maximum in 0.01 N HCl at 347 mμ. minimum at 277 mμ. The gum gives a deep red color with ferric chloride in methanol and liberates $CO_2$ from a saturated $NaHCO_3$ solution.

The acid is esterified by dissolving in chloroform (1.1), methanol (50 ml.) and conc. $H_2SO_4$ (10 ml.) and refluxing gently for 15 hours. The solution is cooled, poured into excess water and the chloroform layer separated. The aqueous layer is extracted with chloroform (250 ml.), and the combined chloroform extracts are backwashed twice with cold water. The extract is then dried over anhydrous sodium sulphate, treated with activated charcoal, filtered and evaporated to a red gum in vacuo. This gum does not liberate $CO_2$ from saturated bicarbonate solution, and gives a deep red color with ferric chloride in methanol.

The ester product, 3.825 grams, and 1.275 g. of sodium hydride (56.5% solution in oil) are dissolved in 25 ml. of dimethyl formamide. An exothermic reaction sets in with the evolution of hydrogen gas. After the evolution of gas ceases, the mixture is warmed at 40° C. for ½ hour where further evolution of hydrogen gas occurs and the reaction mixture darkens. The reaction mixture is finally digested on a steam bath for 10 minutes after which it is cooled and acidified with glacial acetic acid (15 ml.). The product is then obtained by dilution of the mixture with water followed by extraction with chloroform. The dried chloroform solution is concentrated under reduced pressure to obtain a gummy residue which crystallizes on trituration in methanol. The orange-yellow crystalline product, 2 - carbomethoxy - 5 - methoxy-8-chloro-3,4,10-trioxo - 1,2,3,4,4a,9,9a,10 - octahydroanthracene, (1,2 g.) melts at 196–201.5° C.

EXAMPLE 37

2-carbobenzyloxy-5-methoxy-8-chloro-3,4,10-trioxo-1,2,3,4,4a,9,9a,10-octahydroanthracene 2 - (2 - carboxyethyl)-5-methoxy-8-chloro-4-tetralone, 28.3 g. (0.10 mole), is combined with 32.4 g. (0.30 mole) benzyl alcohol, 60 ml. ethylene dichloride and 0.6 ml. concentrated sulfuric acid. The mixture is heated at reflux for 4 hours, then cooled and water-washed. It is then dried over magnesium sulfate and filtered. The filtrate is concentrated under reduced pressure and the resulting 48 g. residue is crystallized from ethyl acetate-hexane. 25.7 g. of the benzyl ester of the starting compound is obtained, melting at 81–85° C. After recrystallization from ethyl acetate-hexane it melts at 84.0–85.5° C.

*Analysis.*—Calc. for $C_{21}H_{21}O_4Cl$ (percent): C, 67.65; H, 5.68; Cl, 9.51. Found (percent): C, 67.63; H, 5.81; Cl, 9.4.

This substance is dissolved together with 0.04 mole dibenzyl oxalate in 50 ml. dry distilled dimethyl formamide. To this is added 0.08 mole sodium hydride in the form of a 50% oil dispersion, while maintaining the temperature at about 20–25° C. Benzyl alcohol, 0.02 mole, is added, and the mixture is heated to 80° C. for 5 minutes, then cooled to 20° C. and slowly acidified with glacial acetic acid. The reaction mixture is next evaporated to dryness under reduced pressure and the residue is taken up in chloroform. The chloroform solution is washed with water, then with brine, dried over sodium sulfate, treated with activated carbon and filtered. The filtrate is evaporated at reduced pressure to obtain the desired product as residue. It is purified by evaporation of the highly fluorescent, less polar eluate fraction from silicate acid chromatography in chloroform.

EXAMPLE 38

2-carbomethoxy-5-hydroxy-8-chloro-3,4,10-trioxo-1,2,3,4, 4a,9,9a,10-octahydroanthracene Dimethyl oxalate, 0.84 g., and 2-(2-carbomethoxyethyl)-5-hydroxy-8-chloro-4-tetralone, 2.0 g., are added to a suspension of 0.34 g. sodium hydride in 10 ml. dimethyl formamide and the mixture is heated to 70° C. for three minutes. After cooling the reaction mixture is treated with 10 ml. acetic acid and evaporated to dryness at reduced pressure. The residual gum is triturated with water to remove sodium acetate and chromatographed on silicic acid in chloroform. The main effluent fraction is dried to a bright yellow solid which is crystallized from chloroform-hexane to provide 380 mg. product melting at 218–219.5° C.

*Analysis.*—Calcd. for $C_{16}H_{13}O_6Cl$ (percent): C, 56.7; 3.9; Cl, 10.5. Found (percent): C, 56.56; H, 3.39; Cl, 10.8.

EXAMPLE 39

2-cyano-5-methoxy-8-chloro-3,4,10-trioxo-1,2,3,4,4a,9, 9a,10-octahydroanthracene Sodium hydride, 3.1 g. of a 50% dispersion in oil, is suspended in 50 ml. dry dimethyl formamide. To this is added 4.1 g. 2-(2-cyanoethyl)-8-chloro-5-methoxytetralone together with 3.9 g. dimethyl oxalate in 25 ml. dimethyl formamide. The mixture is stirred under nitrogen while the temperature is raised rapidly to 95° C. and maintained there until an exothermic reaction ensues. The temperature rises to about 100° C. with the external heating source removed. When the reaction subsides the mixture is cooled to 30° C. and carefully acidified with acetic acid. The solvent is then evaporated at reduced pressure and the residue distributed between chloroform and water. The chloroform layer is then washed with water and with brine, dried, treated with activated carbon, and filtered. The filtrate is evaporated to a brown solid, which is hexane-washed and triturated with ethyl acetate to obtain 3.1 g. of product melting at 237–239° C. Recrystallization from tetrahydrofuran-ethyl acetate gives 2.9 g. melting at 260–262° C. with decomposition.

*Analysis.* — Calcd. for $C_{16}H_{12}O_4NCl$ (percent): C, 60.48; H, 3.81; N, 4.41. Found (percent): C, 60.13; H, 3.89; N, 4.27.

EXAMPLE 40

The tetralones prepared by the procedures of the earlier examples are condensed with diethyl oxalate according to the methods of Example 36 to obtain 3,4,10-trioxoanthracene derivatives given below. Those compounds having an active hydrogen require the use of an additional mole of sodium hydride.

The recovery is as follows: the reaction mixture is chilled to 15° C. and carefully acidified with glacial acetic acid. The dimethyl formamide and excess acetic acid are then removed in vacuo and the residue partitioned between water and chloroform. The aqueous phase is re-extracted with chloroform, the combined chloroform extracts treated with activated carbon, dried, and filtered. The chloroform solution is chromatographed on silicic acid or acid-washed Flourisil. The highly fluorescent product fraction is collected and evaporated to obtain the desired substance.

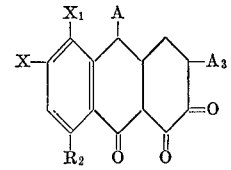

| X | $X_1$ | $X_2$ | A | $A_3$ |
|---|---|---|---|---|
| H | H | H | H | $CO_2Et$ |
| H | Et | OMe | H | CN |
| H | $NMe_2$ | OMe | H | $CO_2Et$ |
| H | $NH_2$ | OMe | H | $CO_2Bz$ |
| H | NHAc | OMe | H | $CO_2Pr$ |
| Me | Cl | OH | H | $CO_2ET$ |
| i-Pr | Cl | OH | H | $CO_2Et$ |
| Et | Et | OH | H | $CO_2Et$ |
| H | Cl | OBz | H | $CO_2Pr$ |
| H | Cl | OH | H | $CO_2Bu$ |
| $NH_2$ | Cl | OMe | H | $CO_2Bz$ |
| Et | Cl | OMe | H | $CO_2Bz$ |
| Me | Cl | OMe | H | $CO_2Bz$ |
| $NMe_2$ | Cl | OH | H | $CO_2H$ |
| Me | Me | H | H | $CO_2H$ |
| H | Cl | OH | H | $CO_2H$ |
| H | Cl | OMe | Mo | $CO_2H$ |
| H | Cl | OMe | Et | $CO_2H$ |
| H | Cl | OMe | Pr | $CO_2H$ |
| H | Me | OH | H | $CO_2H$ |
| Me | Me | OH | H | $CO_2H$ |
| H | Cl | OH | Pr | $CO_2H$ |
| H | Me | OMe | H | CN |
| Me | Cl | OMe | H | $CO_2H$ |
| OMe | H | OMe | H | $CO_2Et$ |
| H | Cl | OH | Mo | $CO_2H$ |
| i-Pr | H | OH | H | $CO_2Bz$ |
| H | $NH_2$ | OBz | H | $CO_2Me$ |
| H | Pr | OPr | H | $CO_2Me$ |
| H | H | OH | H | $CO_2Me$ |
| H | H | OMe | Me | $CO_2Me$ |
| H | H | OMe | Et | $CO_2Me$ |
| H | H | OMe | Pr | $CO_2Me$ |
| H | H | OMe | H | $CO_2Bz$ |
| H | H | OH | Me | $CO_2H$ |
| H | H | OH | Et | $CO_2H$ |
| H | H | OH | Pr | $CO_2H$ |
| OCOMe | Cl | OEt | Et | $CO_2Me$ |
| $CF_3$ | $CF_3$ | OMe | H | $CO_2Me$ |
| OBu | $CF_3$ | OBu | H | $CO_2Et$ |
| NHEt | $CF_3$ | OMe | H | $CO_2Et$ |
| NHCOPr | H | H | H | $CO_2Me$ |
| H | $CF_3$ | OH | H | $CO_2Bz$ |
| OH | Cl | OH | H | $CO_2Et$ |
| NHAc | H | OH | H | $CO_2Et$ |
| $CF_3$ | H | OH | H | $CO_2Et$ |
| OH | H | H | Me | $CO_2Et$ |
| H | H | OBz | H | $CO_2Bz$ |
| $NH_2$ | H | OMe | H | $CO_2Bz$ |
| Pr | H | OMe | H | $CO_2Bz$ |
| Me | H | OMe | H | $CO_2Bz$ |
| $NMe_2$ | H | OH | H | $CO_2Bz$ |
| H | $CF_3$ | H | H | $CO_2Bz$ |
| Et | H | OMe | H | $CO_2Bu$ |
| OMe | Cl | H | H | $CO_2Me$ |
| NHAc | Cl | OMe | H | $CO_2Me$ |
| H | $CF_3$ | H | Me | $CO_2Me$ |
| H | $CF_3$ | OMe | Me | $CO_2Et$ |
| H | H | OEt | Me | $CO_2Bz$ |
| H | Me | OMe | H | $CO_2Bz$ |
| H | Cl | OCOEt | H | $CO_2Et$ |
| H | Cl | OCOMe | H | $CO_2Et$ |
| i-Pr | H | OMe | H | $CO_2Bz$ |
| OCOMe | H | H | H | $CO_2Me$ |
| OCOEt | H | H | H | $CO_2Me$ |
| OBz | H | H | H | $CO_2Et$ |
| Me | H | OH | H | $CO_2Pr$ |
| H | Cl | OBz | H | $CO_2Me$ |

TABLE—Continued

| X | X₁ | X₂ | A | A₃ |
|---|---|---|---|---|
| NHMe | H | OPr | H | CO₂Bu |
| OMe | H | OMe | Me | CO₂Me |
| H | H | OMe | Me | CO₂Bz |
| NH₂ | H | OMe | H | CO₂Et |
| H | CF₃ | OMe | H | CO₂Me |
| OBz | H | OMe | Pr | CO₂Me |
| H | H | Ome | i-Pr | CO₂Bz |
| H | NHAC | OMe | H | CO₂Et |
| NHAc | H | OMe | H | CO₂Bz |

In the above table Me=CH₃; Et=C₂H₅; Pr=C₃H₇; Ac=COCH₃; and Bz=benzyl. Ether substituents are converted to hydroxy groups by HBr cleavage.

EXAMPLE 41

5-methoxy-8-chloro-3,4,10-trioxo-1,2,3,4,4a,9,9a,10-octahydroanthracene

*Method A.*—A mixture of 10 g. of the ester product of Example 36, 250 ml. of glacial acetic acid, 125 ml. concentrated HCl and 25 ml. of water is heated at 95° C. for 1 hour. During the first 45 minutes considerable effervescence occurs and the suspended matter gradually dissolves to give a deep red-brown solution. The reaction mixture is then poured into 2 liters of cold water and extracted with chloroform. The combined extracts are washed with water, decolorized with activated carbon, dried and evaporated to an orange-crystalline solid (6.9 g.) which melts at 171–172.8° C. After recrystallization from acetone-hexane, the product melts at 172–173° C. This procedure is repeated on a larger scale, as follows: methyl 5 - methoxy-8-chloro-3,4,10-trioxo-1,2,3,4,4a,9,9a,10-octahydroanthracene-2-carboxylate (357 g., 1.02 mole) is combined with 7.4 liters glacial acetic acid, 4.9 liters concentrated hydrochloric acid, and 1.0 liter water, and stirred under nitrogen at 90–94° C. for 45 minutes. The mixture is cooled to room temperature and treated with 4.0 liters ice-water followed by 3.0 liters chloroform, with stirring. The layers are separated and the aqueous layer is extracted with three 1.5 liter portions of chloroform. The combined chloroform layers are washed four times with water, dried over anhydrous sodium sulfate, and decolorized with Darco KB activated carbon. After filtering, the solution is concentrated to dryness in vacuo and the residue is taken up in 2.0 liters warm ethyl acetate. The ethyl acetate solution is concentrated in vacuo to 800 ml. Upon chilling, crystalline product separates and is filtered off and dried. A yield of 216.0 g. (74% of theory) is obtained, melting at 172–175° C.

*Method B.*—The 2-carbobenzyloxy compound (5 g.) corresponding to that of Example 36 is treated with hydrogen gas at room temperature in acetic acid and in the presence of 0.5 g. of 5% palladium on carbon at 50 p.s.i.g. until one molar equivalent of gas is taken up. The product is obtained by filtration and concentration of the reaction mixture after warming to 60° C. for 20 minutes to ensure complete evolution of carbon dioxide.

*Method C.*—The product of Example 36 (3 g.) is refluxed for 3 hours in 10 ml. of acetic acid, 10 ml. of concentrated sulfuric acid and 1 ml. of water after which chloroform is added to the mixture which is then poured into excess water. The product is obtained by separation of the chloroform layer, washing, drying over sodium sulfate and concentration. A solid residue is obtained and recrystallized from methanol.

If desired, further purification is achieved by chromatography on silicic acid with chloroform elution. The product is contained in the less polar effluent fraction.

EXAMPLE 42

Products such as those of Example 40 are decarboxylated (benzyl esters by hydrogenolysis according to Method B, Example 41, and lower alkyl esters and nitriles by the procedure of Method C, Example 41 to produce the following compounds. Nitriles require a 24-hour reflux period.

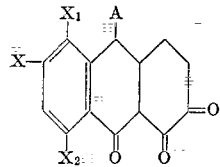

| X | X₂ | X₃ | A |
|---|---|---|---|
| H | H | H | H |
| H | Et | OMe | H |
| H | NMe₂ | OMe | H |
| H | NH₂ | OMe | H |
| H | NHAc | OMe | H |
| Me | Cl | OH | H |
| i-Pr | Cl | OH | H |
| Et | Et | OH | H |
| H | Cl | OBz | H |
| H | Cl | OH | H |
| NH₂ | Cl | OMe | H |
| Et | Cl | OMe | H |
| Me | Cl | OMe | H |
| NMe₂ | Cl | OH | H |
| Me | Me | H | H |
| H | Cl | OH | H |
| H | Cl | OMe | Me |
| H | Cl | OMe | Et |
| H | Cl | OMe | Pr |
| H | Me | OH | H |
| Me | Me | OH | H |
| H | Cl | OH | Pr |
| H | Me | OMe | H |
| Me | Cl | OMe | H |
| OMe | H | OMe | H |
| H | Cl | OH | Me |
| i-Pr | H | OH | H |
| H | NH₂ | OBz | H |
| H | Pr | OPr | H |
| H | H | OH | H |
| H | H | OMe | Me |
| H | H | OMe | Et |
| H | H | OMe | Pr |
| H | H | OMe | H |
| H | H | OH | Me |
| H | H | OH | Et |
| H | H | OH | Pr |
| OCOMe | Cl | OEt | Et |
| CF₃ | CF₃ | OMe | H |
| OBu | CF₃ | OBu | H |
| NHEt | CF₃ | OMe | H |
| NHCOPr | H | H | H |
| H | CF₃ | OH | H |
| OH | Cl | OH | H |
| NHAc | H | OH | H |
| CF₃ | H | OH | H |
| OH | H | H | Me |
| H | H | OBz | H |
| NH₂ | H | OMe | H |
| Pr | H | OMe | H |
| Me | H | OMe | H |
| NMe₂ | H | OH | H |
| H | CF₃ | H | H |
| Et | H | OMe | H |
| OMe | Cl | H | H |
| NHAc | Cl | OMe | H |
| H | CF₃ | H | Me |
| H | CF₃ | OMe | Me |
| H | H | OEt | Me |
| H | Me | OMe | H |
| H | Cl | OCOEt | H |
| H | Cl | OCOMe | H |
| i-Pr | H | OMe | H |
| OCOMe | H | H | H |
| OCOEt | H | H | H |
| OBz | H | H | H |
| Me | H | OH | H |
| H | Cl | OBz | H |
| NHMe | H | OPr | H |
| OMe | H | OMe | Me |
| H | H | OMe | Me |
| NH₂ | H | OMe | H |
| H | CF₃ | OMe | H |
| OBz | H | OMe | Pr |
| H | H | OMe | i-Pr |
| H | NHAc | OMe | H |
| NHAc | H | OMe | H |

In the above table Me=CH₃; Et=C₂H₅; Pr=C₃H₇; Ac=COCH₃; and Bz=benzyl.

Those compounds containing basic (amino) groups are isolated by adjustment to pH 6 followed by butanol extration and concentration of the extract.

EXAMPLE 43

5-methoxy-8-chloro-3,4,10-trioxo-1,2,3,4,4a,9,9a,10-octahydroanthracene-4-enol methyl ether To 5-methoxy-8-chloro-3,4,10-trioxo-1,2,3,4,4a,9,9a,10-octahydroanthracene (0.59 g.) in 100 ml. ether is added chloroform to bring about solution. Diazomethane (0.5 g.) in 50 ml. ether and 70 ml. methanol is then added and the solution allowed to stand for eight days. A further quantity of diazomethane (0.08 g.) in 100 ml. ether is added and the solution allowed to stand for 10 more days at the end of which time an aliquot of the solution no longer gives a positive ferric chloride test. The solution is stripped in vacuo and the buff colored residue washed with ether. After two recrystallizations from ether it melts at 181–183° C.

*Analysis.*—Calcd. for $C_{16}H_{15}O_7Cl$ (percent): C, 62.64; H, 4.92; Cl, 11.5. Found (percent): C, 62.80; H, 5.20; Cl, 12.4.

EXAMPLE 44

3,4,10-trioxo-5-benzyloxy-1,2,3,4,4a,9,9a,10-octahydroanthracene enol methyl ether 3,4,10-trioxo - 5 - benzyloxy-1,2,3,4,4a,9,9a,10-octahydroanthracene is dissolved in ether-chloroform and treated with diazomethane as in the previous example. After the reaction, the enol methyl ether of the starting compound is obtained by concentration of the reaction mixture.

In like manner, the 4-enol methyl ethers of the triketo octahydroanthracenes of Example 42 are prepared.

What is claimed is:
1. A compound of the formula

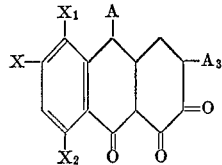

wherein:

X is selected from the group consisting of hydrogen, hydroxy, trifluoromethyl, amino, mono- and di-lower alkyl amino, alkanoylamino containing 2 to 4 carbon atoms, lower alkyl, alkanoyloxy containing 2 to 4 carbon atoms; and OR wherein R is selected from the group consisting of lower alkyl and benzyl;

$X_1$ is selected from the group consisting of hydrogen, chloro, trifluoromethyl and lower alkyl;

$X_2$ is selected from the group consisting of hydrogen, hydroxy, and OR wherein R is as previously described;

A is selected from the group consisting of hydrogen and lower alkyl;

$A_3$ is selected from the group consisting of lower carbalkoxy, carbobenzyloxy and cyano.

2. The compound of claim 1 wherein $X_1$ is chloro, $X_2$ is hydroxy, $A_3$ is carbomethoxy and A and X are each hydrogen.

3. The compound of claim 1 wherein X and $X_2$ are each methoxy, A is methyl, $A_3$ is carbomethoxy and $X_1$ is hydrogen.

4. The compound of claim 1 wherein $X_2$ is methoxy, A is methyl, $A_3$ is carbobenzyloxy and X and $X_1$ are each hydrogen.

5. The compound of claim 1 wherein X is amino, $X_2$ is methoxy, $A_3$ is carboethoxy and A and $X_1$ are each hydrogen.

6. The compound of claim 1 wherein $X_1$ is trifluoromethyl, $X_2$ is methoxy, $A_3$ is carbomethoxy and A and X are each hydrogen.

References Cited
UNITED STATES PATENTS

| | | | |
|---|---|---|---|
| 3,102,914 | 9/1963 | Wilkinson | 260—351 |
| 3,153,067 | 10/1964 | Fields | 260—351 |
| 3,167,579 | 1/1965 | Fields et al. | 260—351 |
| 3,192,235 | 6/1965 | Wilkinson et al. | 260—351 |
| 3,192,250 | 6/1965 | Fields et al. | 260—351 |
| 3,201,462 | 8/1965 | Wilkinson et al. | 260—351 |

LORRAINE A. WEINBERGER, Primary Examiner

H. C. WEGNER, Assistant Examiner

U.S. Cl. X.R.

260—239.3, 465, 469, 471, 473, 475, 479, 515, 518, 519, 520, 521, 544, 562, 570, 591, 613, 619, 999

PO-1050
(5/69)

UNITED STATES PATENT OFFICE
CERTIFICATE OF CORRECTION

Patent No. 3,502,697  Dated March 24, 1970

Inventor(s) Robert B. Woodward

It is certified that error appears in the above-identified patent and that said Letters Patent are hereby corrected as shown below:

Column 2, line 67, "percholoride" should read -- perchloride --.
Column 3, lines 40-45, the formula reading

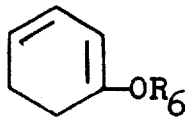    should read    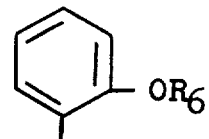    ;

lines 55-62, the formula reading

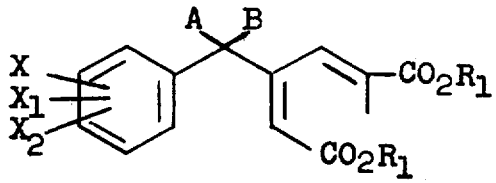    should read    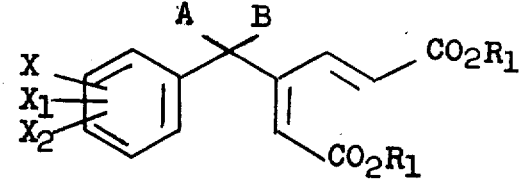    .

Column 4, line 8, "VII to VII" should read -- VII to VIII --;
          line 34, "azonolysis" should read -- ozonolysis --;
          line 34, "from" should read -- form --;
          line 48, "is" (second occurrence) should read -- in --;
          line 52, "skilleded" should read -- skilled --;
          line 67, "ad" should read -- and --.
Column 6, line 24, "mode" should read -- mole --.
Column 12, line 40, "benzolyloxy" should read -- benzoyloxy --;
           line 49, "substitutes" should read -- substituents --;
           line 68, "alkanoles" should read -- alkanols --.
Column 11, line 40, "J" should read -- H --.
Column 16, lines 23-30, that portion of the formula reading

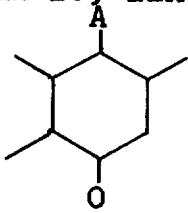    should read    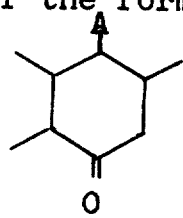

3,502,697
(2)

Column 19, line 51, "flash" should read -- flask --.
Column 20, line 9, "200-205 C." should read -- 200-205°C. --;
          line 67, "(1,2 g.)" should read -- (1.2 g.) --.
Column 21, line 26, "silicate" should read -- silicic --.
Column 22, line 17, "Flourisil" should read -- Florisil --;
          line 33, "CO$_2$ET" should read -- CO$_2$Et --;
          line 41, "Mo" should read -- Me --;
          line 47, "Mo" should read -- Me --.
Column 23, line 7, "Ome" should read -- OMe --.

SIGNED AND
SEALED
SEP 22 1970

(SEAL)
Attest:

Edward M. Fletcher, Jr.
Attesting Officer

WILLIAM E. SCHUYLER, JR.
Commissioner of Patents